(12) United States Patent
Julien et al.

(10) Patent No.: US 8,594,471 B2
(45) Date of Patent: Nov. 26, 2013

(54) ADAPTIVE WAVEGUIDE OPTICAL SWITCHING SYSTEM AND METHOD

(75) Inventors: Martin Julien, Laval (CA); Robert Brunner, Montreal (CA); Stephane Lessard, Mirabel (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 363 days.

(21) Appl. No.: 13/076,055

(22) Filed: Mar. 30, 2011

(65) Prior Publication Data

US 2012/0251042 A1    Oct. 4, 2012

(51) Int. Cl.
  *G02B 6/293*      (2006.01)
(52) U.S. Cl.
  USPC ............................................. 385/24; 385/17
(58) Field of Classification Search
  None
  See application file for complete search history.

(56) References Cited

U.S. PATENT DOCUMENTS

| | | | |
|---|---|---|---|
| 6,115,517 A | 9/2000 | Shiragaki et al. | |
| 6,195,187 B1 * | 2/2001 | Soref et al. | 398/9 |
| 6,243,178 B1 | 6/2001 | Suemura et al. | |
| 6,751,372 B2 * | 6/2004 | Feuer et al. | 385/24 |
| 2002/0105692 A1 | 8/2002 | Lauder et al. | |
| 2005/0226620 A1 | 10/2005 | Feuer et al. | |

FOREIGN PATENT DOCUMENTS

| | | |
|---|---|---|
| GB | 2 376 532 A | 12/2002 |
| WO | 0076252 A1 | 12/2000 |

OTHER PUBLICATIONS

Andrea Melloni et al.: "The ring-based optical Resonant Router"; XP031025490; Jun. 1, 2006; pp. 2799-2804.
International Search Report for PCT/IB2012/051576, mailing date of Aug. 28, 2012; 5 pages.

* cited by examiner

*Primary Examiner* — Jerry Rahll
(74) *Attorney, Agent, or Firm* — Ericsson Canada Inc.; Alex Nicolaescu

(57) ABSTRACT

Systems and methods according to these exemplary embodiments provide for optical interconnection using a combination of an arrayed waveguide grating router (AWGr) and optical crossbar. Optical wavelengths can be flexibly routed from an input port to one or more output ports. Scaling of the system is easily accommodated.

18 Claims, 14 Drawing Sheets

ADAPTIVE WAVEGUIDE OPTICAL SWITCHING SYSTEM AND METHOD

TECHNICAL FIELD

The present invention relates generally to telecommunications systems and in particular to optical switches and associated methods.

BACKGROUND

Communications technologies and uses have greatly changed over the last few decades. In the fairly recent past, copper wire technologies were the primary mechanism used for transmitting voice communications over long distances. As computers were introduced the desire to exchange data between remote sites became desirable for many purposes. The introduction of cable television provided additional options for increasing communications and data delivery from businesses to the public. As technology continued to move forward, digital subscriber line (DSL) transmission equipment was introduced which allowed for faster data transmissions over the existing copper phone wire infrastructure. Additionally, two way exchanges of information over the cable infrastructure became available to businesses and the public. These advances have promoted growth in service options available for use, which in turn increases the need to continue to improve the available bandwidth for delivering these services, particularly as the quality of video and overall amount of content available for delivery increases.

One promising technology that has been introduced is the use of optical fibers for telecommunication purposes. Optical fiber network standards, such as synchronous optical networks (SONET) and the synchronous digital hierarchy (SDH) over optical transport networks (OTNs), have been in existence since the 1980s and allow for the possibility to use the high capacity and low attenuation of optical fibers for long haul transport of aggregated network traffic. These standards have been improved upon and today, using OC-768/STM-256 (versions of the SONET and SDH standards respectively), a line rate of 40 gigabits/second is achievable using dense wave division multiplexing (DWDM) on standard optical fibers.

In terms of system scalability, it is desirable to allow a system to freely scale from a minimal to a very large configuration, requiring, as much as possible, the minimum hardware and software for the intended capacity of the system. Basically, systems should be capable of scaling as operators grow, also called "pay as you grow", which could possibly be achieved with a system that would scale linearly.

Ideally, it should be possible to build a small system, and scale it by simply adding new components or devices to the system in order to provide more capacity. It should be possible to minimize the need to over-provision a system with hardware capabilities in order to allow a system to scale. For example, it should be possible for a system capable of scaling up to 100 blades, to not require a switch fabric supporting 100 blades if only 10 blades are needed to fulfill the current needs of an operator. New hardware components should rather be added to the switch fabric when needed, in order to scale it on demand.

While optical technology is getting more mature, the cost related to its use is decreasing. Also, as systems are getting more requirements for capacity and sustainability, optical-based solutions become more attractive for system architecture designs. However, networking systems have different needs from the ones of large optical networks. Specific solutions might have to be developed on a system basis, rather than on a more generic network basis. While expensive solutions might be affordable for a network, they might not be acceptable at a node level.

As optical-based networks are being deployed, there is an increasing need in providing efficient solutions for switching and routing information within and between such networks. Currently, the specialized optical switches that are available for large optical networks are typically extremely expensive as they are developed for specific types of core networks. That also means that such optical switches must provide flexible solutions and value-added features such as accounting, rate-limiting, etc.

For building networking systems using an internal system network based on optical technologies, simple, scalable, reliable and affordable solutions are needed for optical switches and crossbars. Optical crossbars have the capabilities to redirect an optical wavelength, or lambda, between an input port and an output port of the device. They can be built using technologies such as MEMS, micro-ring resonators, Mach-Zehnder interferometers, etc. Optical crossbars can be used in systems in order to dynamically configure the optical links between the system components, e.g. blades, minimizing the latency, and not requiring any specific header information from the optical signals.

In the context where an optical crossbar would be used as a component of an internal network of a system, it should require a very simple and minimal design, a very small footprint, a high energy efficiency ratio and a low cost. However, this type of device becomes quite complicated when there are requirements to dynamically support configurations allowing multiple wavelengths (WDM) from an input port to be redirected to the same output port, which is required in systems that are intended to scale.

Current solutions for cross-connecting optically different optical links, such as ROADM devices, are typically based on technologies such as MEMS, tunable optical filters and beam-steering switches. As they are designed primarily to interconnect the optical systems of a metropolitan network, their design is typically relatively complex in order to fulfill requirements such as power balancing, statistics, etc. That kind of device is too expensive, offers too many features and is too big for building an internal system network.

Commercially available "basic" crossbars are capable of cross-connecting electrically the components of a system. However, among those devices which are currently on the market, it seems that there are no solutions for efficiently cross-connecting optically the components of a system.

Accordingly, it would be desirable to provide optical switches or crossbars which overcome the aforedescribed drawbacks.

SUMMARY

Systems and methods according to these exemplary embodiments provide for optical interconnection using a combination of an arrayed waveguide grating router (AWGr) and optical crossbar. Optical wavelengths can be flexibly routed from an input port to one or more output ports. For example, it can be advantageous for a system to be capable of optically cross-connecting several wavelengths from the same input port to an output port. Such capability could be used, for example, to allow a system to scale, i.e. by allowing the wavelengths to be dynamically distributed based on the number of output ports activated, which could, for example, be based on the number of blades available within a system at a time.

According to an exemplary embodiment, an optical interconnect device includes an optical crossbar, and an arrayed waveguide grating router (AWGr) connected to the optical crossbar.

According to another exemplary embodiment, a method for routing optical wavelengths in an optical interconnect device includes receiving the optical wavelengths on an ingress port of the optical interconnect device, redirecting the optical wavelengths from an input port of an arrayed waveguide grating router (AWGr) to one or more output ports of the AWGr, redirecting the optical wavelengths from an input port of an optical crossbar to one or more output ports of the optical crossbar, and outputting the optical wavelengths on one or more egress ports of the optical interconnect device.

BRIEF DESCRIPTION OF THE DRAWINGS

The accompanying drawings illustrate exemplary embodiments, wherein.

ABBREVIATIONS/ACRONYMS

AWGr Arrayed Waveguide Grating Router
MEMS Micro-Electro-Mechanical System
PCB Printed Circuit Board
PLC Planar Light wave Circuit
ROADM Reconfigurable Optical Add-Drop Multiplexer
WDM Wavelength-Division Multiplexing

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

According to exemplary embodiments an adaptive waveguide assignment device combines a wavelength-division multiplexing (WDM) optical crossbar with an arrayed waveguide grating router AWGr device. This embodiment enables multiple wavelengths from an input port of the device to be redirected to an output port and, more specifically, is capable of optically cross-connecting several wavelengths from the same input port to an output port. Such a capability could be used, for example, to allow a system to scale, i.e. by allowing the wavelengths to be dynamically distributed based on the number of output ports activated, which could, for example, include scaling based on the number of blades available within a system at a time. The adaptive waveguide assignment device according to these embodiments can also be used to more efficiently interconnect different elements of a system, or to provide a reconfigurable backplane.

Taking the example of a micro-ring resonator-based optical crossbar as the WDM optical crossbar element of the combined device, the different micro-ring resonators can be tuned in order to redirect all of the wavelengths to a specific output port of the optical crossbar. According to some embodiments, the micro-ring resonators can be tuned to avoid the same wavelength from different input ports to be redirected to the same output port. By adding another level of wavelength redirection, either before or after the optical crossbar according to various embodiments described in detail below, e.g. using an AWGr device, the wavelengths can be redirected again in order to provide flexible mechanism that allows selected wavelengths from an input port to be redirected to a specific output port of the combined device.

Figure 1A:
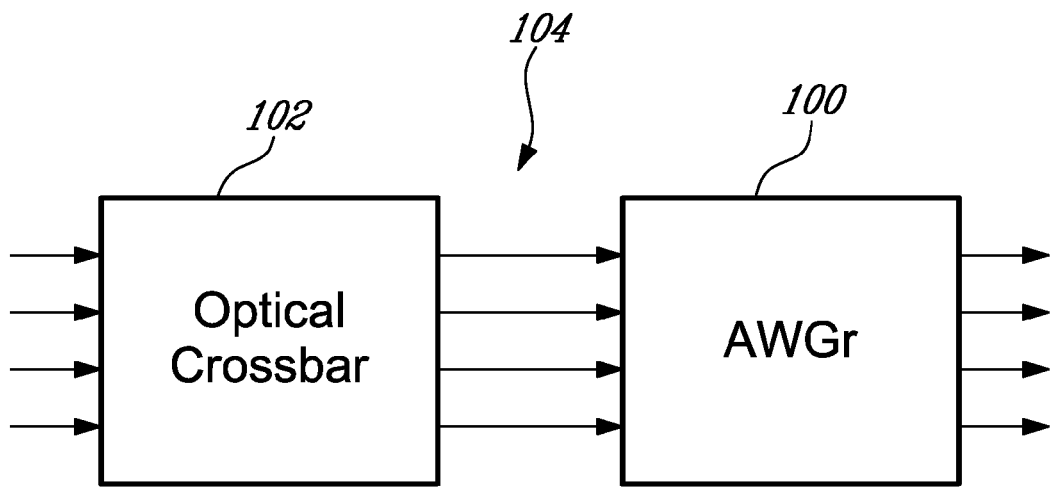
FIGS. 1(*a*) and 1(*b*) depict exemplary optical interconnect devices according to various embodiments.
Figure 1B:
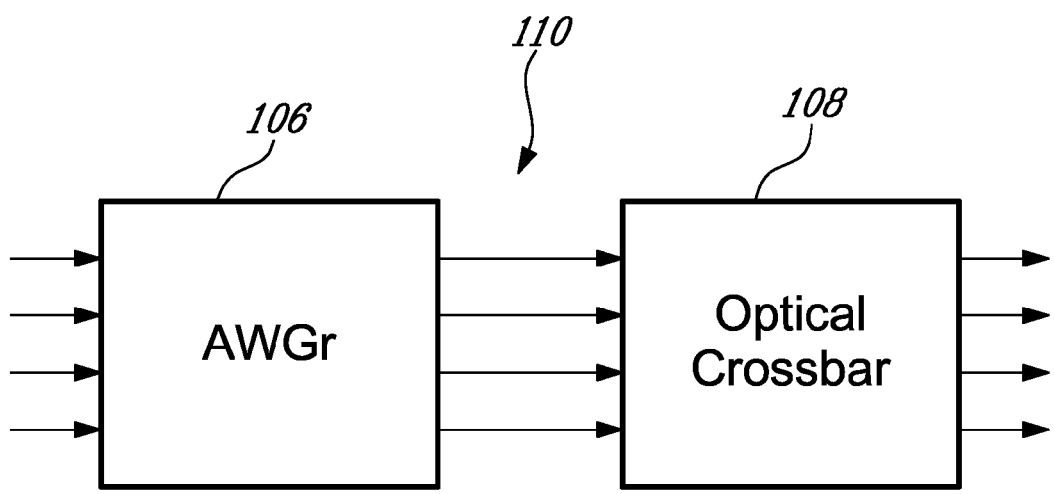

Thus embodiments are described herein wherein an AWGr 100 is placed after an optical crossbar 102, referred to herein as an egress-based device 104 as shown in FIG. 1(*a*), and other embodiments are described herein wherein an AWGr 106 is placed before an optical crossbar 108, referred to herein as an ingress-based device 110. Prior to discussing each of these combined devices 104 and 110 in detail, a discussion of exemplary optical crossbars 102, 108 and exemplary AWGrs 100, 106 will first be provided.

An optical crossbar 102, 108 can be seen as a component with several ports connected to it, each port capable of either only sending, or only receiving, or both sending and receiving optical signals. Typically, an optical crossbar 102, 108 can be used to transfer an optical wavelength from one waveguide to another waveguide. That means that it becomes possible to selectively transfer specific optical signals, or wavelengths, from an input to an output port. As will be appreciated by those skilled in the art, optical crossbars can be built based on several different optical re-direction technologies, such as MEMS, interferometers, micro-ring resonators, etc.

Figure 2:
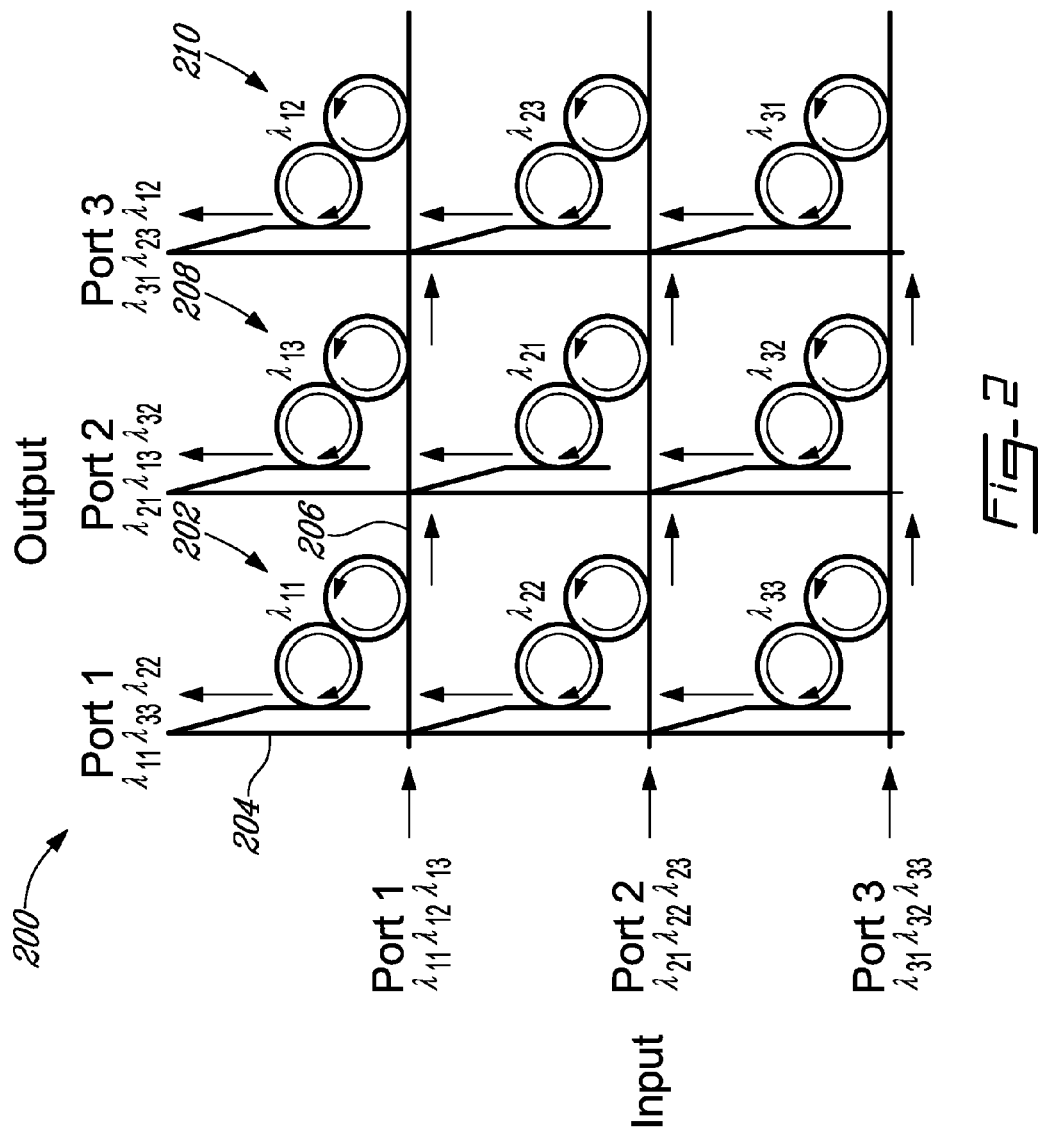
FIG. 2 illustrates an exemplary optical crossbar using dual-ring resonator technology which can be used in optical interconnect devices according to embodiments.

As shown in FIG. 2, a micro-ring resonator-based optical crossbar 200 having three incoming and three outgoing ports can for example, be used to redirect incoming optical wavelengths to output ports. Therein, the optical wavelengths or signals which are input, redirected and output by the device 200 are referenced as $\lambda xy$, where x references the input port number and y references the wavelength number. For example, optical wavelength $\lambda 11$, which is input on port 1 of optical crossbar 200, is redirected to output port 1 by micro-ring resonator pair 202 which extracts $\lambda 11$ and passes it to output waveguide 204 while permitting $\lambda 12$ and $\lambda 13$ to continue travelling in input waveguide 206. These wavelengths $\lambda 12$ and $\lambda 13$ are then extracted by micro-resonator pairs 208 and 210, respectively, to be redirected to output port 2 and output port 3. The other junctions shown in FIG. 2 operate in a similar manner to redirect the identified input wavelengths toward their respective output ports as illustrated.

For the reader who is interested in more detail relating to an optical crossbar which is implemented using micro-ring resonator technology, she or he is referred to U.S. patent application Ser. No. 12/861,185, filed on Aug. 23, 2010, the disclosure of which is incorporated here by reference. Briefly, such an optical crossbar 200 includes a dual micro-ring resonator disposed at each of a plurality of interconnection points between input waveguides and output waveguides in the optical crossbar 200, each of the dual micro-ring resonators being configured to redirect an optical wavelength associated with optical signals from one of the input waveguides to one of the output waveguides. Each of the dual micro-ring resonators includes a first micro-ring connected to a respective input waveguide, a second micro-ring connected to a respective output waveguide; and a coupler configured to transfer light having the tuned or configured optical wavelength associated with that dual micro-ring resonator from the first micro-ring into the second micro-ring.

Based on this exemplary micro-ring resonator technology, it is thus possible to dynamically tune a dual-micro-ring resonator in order to redirect a specific wavelength from an input to an output port, allowing an optical crossbar to be reconfigurable dynamically. It is important to note, however, that an optical crossbar device based on the micro-ring resonator technology is described herein as an example, but is not intended to limit the possibilities of using other types of technologies that would create the same effect. More specifically, optical crossbar devices 102 and 108 can be implemented using the dual micro-ring resonator technology depicted in FIG. 2, or another technology, e.g., interferometers, etc., which enable selective redirection of optical wavelengths.

As shown above, it is possible to use a micro-ring resonator-based optical crossbar 200 to transfer a maximum of one optical wavelength from an input port to an output port of the device per intersection of waveguides. However, in the case where multiple wavelengths from the same input port need to be redirected to the same output port, e.g., $\lambda 11$ and $\lambda 12$ toward output port 1, the optical crossbar device 200 would have to be modified. For example, optical crossbar device 200 could be modified to include more micro-ring resonators at each intersection of the waveguides, in order to allow for the extraction of several lambdas per intersection. However this solution is likely to be too complex and too restrictive.

Nonetheless, it would be advantageous for a system to be capable of optically cross-connecting several wavelengths from the same input port to an output port. Such capability could be used, for example, to allow a system to scale, i.e. by allowing the wavelengths to be dynamically distributed based on the number of output ports activated, e.g., based on the number of blades available within a system at a given time. This capability could also be used to more efficiently interconnect different elements of a system, or to provide a reconfigurable backplane.

Figure 3:
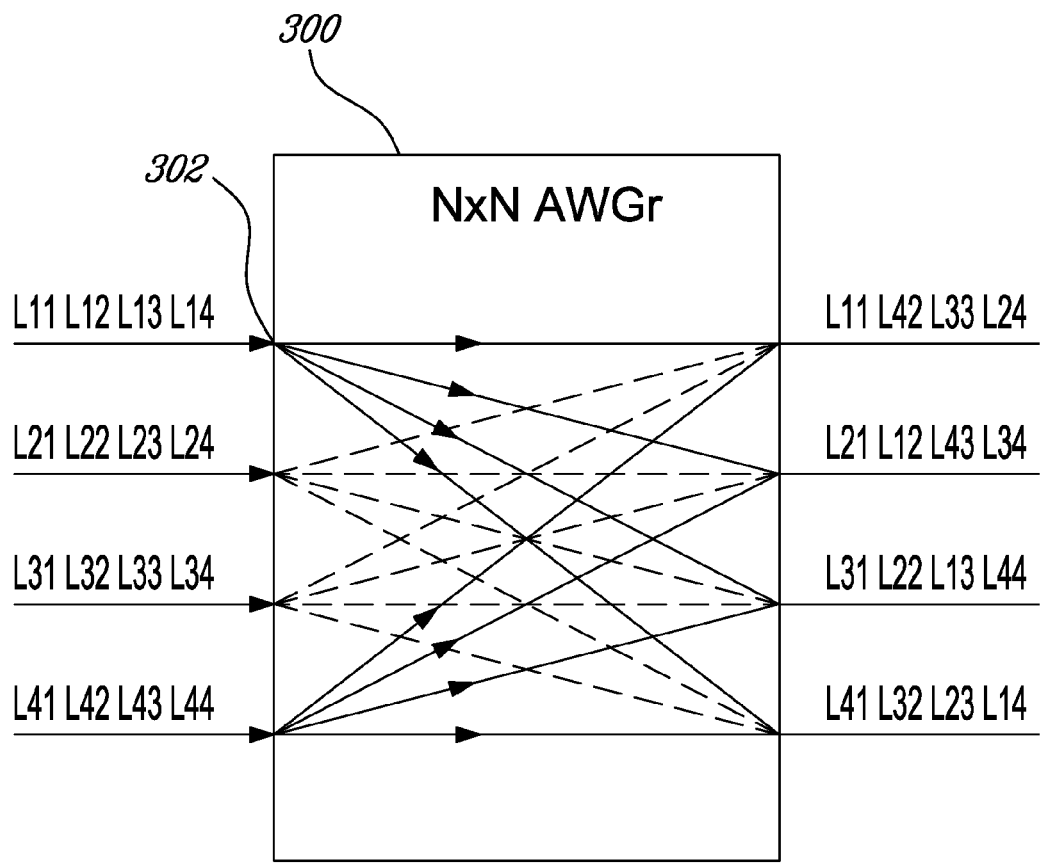
FIG. 3 illustrates an exemplary arrayed waveguide grating router which can be used in optical interconnect devices according to embodiments.

As mentioned above with respect to FIGS. 1(*a*) and 1(*b*), this capability is provided according to various embodiments by connecting an AWGr device to an optical crossbar device. An AWGr can be used to route optical signals to different output ports based on the wavelengths of the signal at its input port. As shown in FIG. 3, where the labels "Lxy" mean lambda or wavelength from input port X having wavelength Y, wavelengths received on the input ports are redirected to specific output ports of the AWGr 300. This behavior is illustrated by redirecting each of the wavelengths received on port 1 to different output ports based on their wavelength, i.e., L11, L12, L13 and L14 received on the first input port 302 are each redirected to different output ports. It will be appreciated that this is an illustrative example of one input port to output port mapping but that an AWGr 300 can be designed with any desired mapping. Typically, an AWGr 300 offers a static wavelength to output port mapping, which means that it is not possible to dynamically change that mapping.

In order to have more control on the redirection of wavelengths from an input port to an output port, exemplary embodiments combine a reconfigurable WDM optical crossbar, e.g., device 200 and an AWGr device, e.g., device 300 (although typically the optical crossbar device and AWGr device would have the same numbers of input ports and output ports). By connecting an AWGr device to the input or output ports of a WDM optical crossbar device, such as a micro-ring resonator-based optical crossbar, it becomes possible to build and configure the two devices in order to allow a more dynamic mapping of incoming wavelengths to output ports.

For example, assuming that a micro-ring resonator-based optical crossbar would have at least as many output ports as the number of wavelengths available on an incoming port, it should be possible to tune the different micro-ring resonators in order to redirect all the wavelengths to a specific output port of the optical crossbar, as shown in FIG. 2. Note that the micro-ring resonators in the optical crossbar device 200 should be tuned to avoid the same wavelength from different input ports to be redirected to the same output port. By adding another level of wavelength redirection either before or after the optical crossbar, it becomes possible to redirect again the wavelength in order to get a flexible mechanism to allow selected wavelengths from an input port to be redirected to a specific output port of the combined device. As shown in FIG. 3, an AWGr is basically capable of redirecting a specific wavelength from a specific input port to a specific output port, without the possibility to dynamically reconfigure this mapping. However, it is possible to dynamically reconfigure, for example, a micro-ring resonator-based optical crossbar in order to strategically select which wavelength to redirect to which output port of the optical crossbar device, so that the AWGr device would redirect the optical signal to the desired output port of the AWGr.

Figure 4:
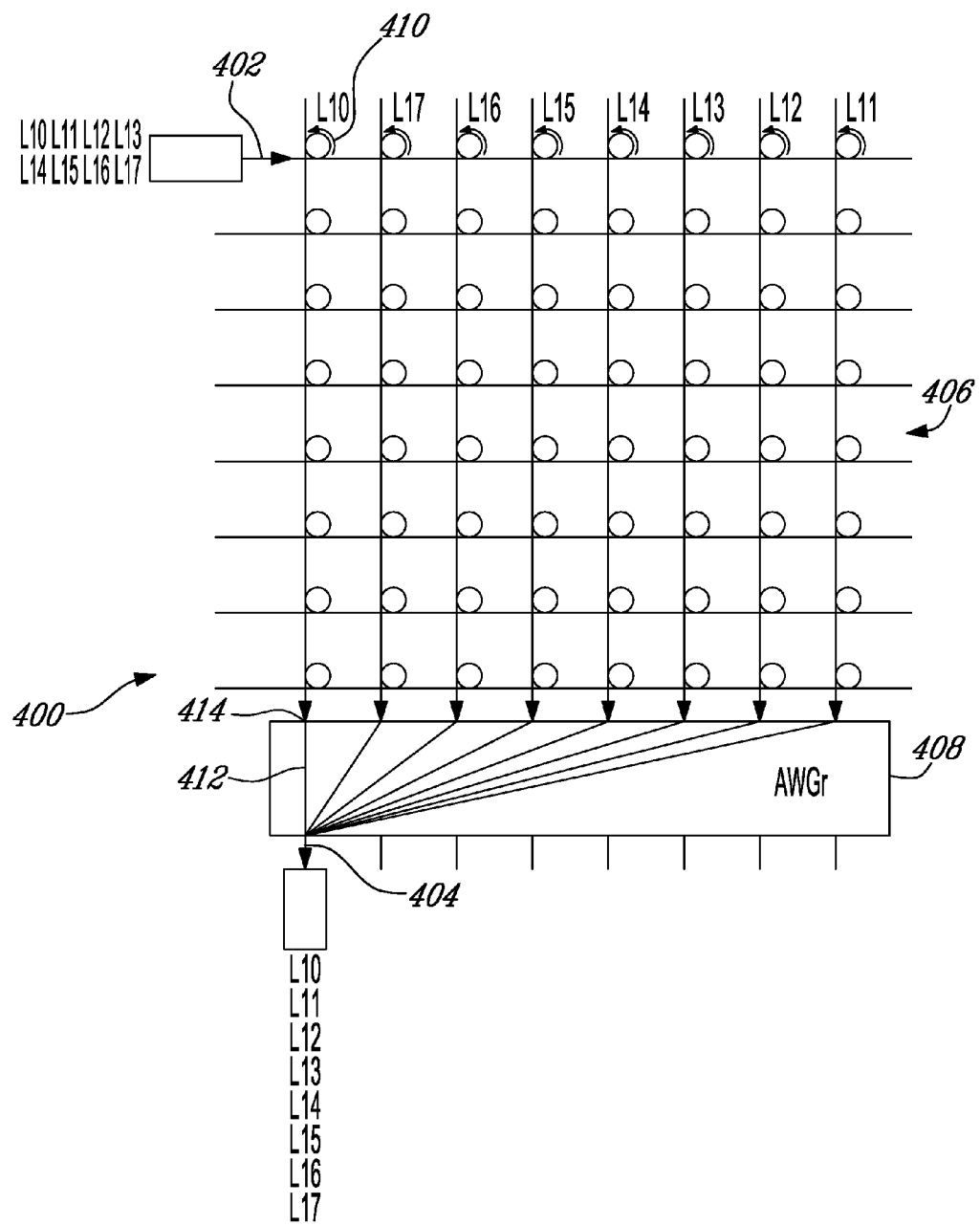
FIG. 4 depicts WDM 1-to-1 port connectivity using an egress-based adaptive waveguides assignment device according to an exemplary embodiment.

According to one egress-based embodiment, the combination of an optical crossbar device with an AWGr device is made so that the AWGr is connected to the output ports of the optical crossbar device. As shown in FIG. 4, an adaptive waveguides assignment device 400 is used to redirect all of the wavelengths from an input port 402 to a single output port 404 by connecting together a suitably designed optical crossbar device 406 with an AWGr 408. Note that each of the lines between input ports and output ports within the AWGr 408 are associated with different wavelengths in this example. Assuming that the AWGr 408 has a pre-determined mapping of wavelengths from its input ports to its output ports, a specific tuning of the micro-ring resonators (represented by the circles with arrows in the first row of optical crossbar device 406) is required in order to produce the expected behavior. For example, if the first micro-ring resonator 410 would have been tuned to redirect the wavelength L11 instead of the wavelength L10, it would not have been possible to redirect the wavelength L10 to the first output port 404 as it is shown in FIG. 4. Instead, the L10 and the L11 wavelengths would have been both redirected to other output ports, since the AWGr 408 was designed so that only the wavelength L10 can go through the AWGr 408 straight through it without any redirection (as shown by the straight line 412 connecting the input port 414 of the AWGr 408 to the output port 404).

Figure 5:
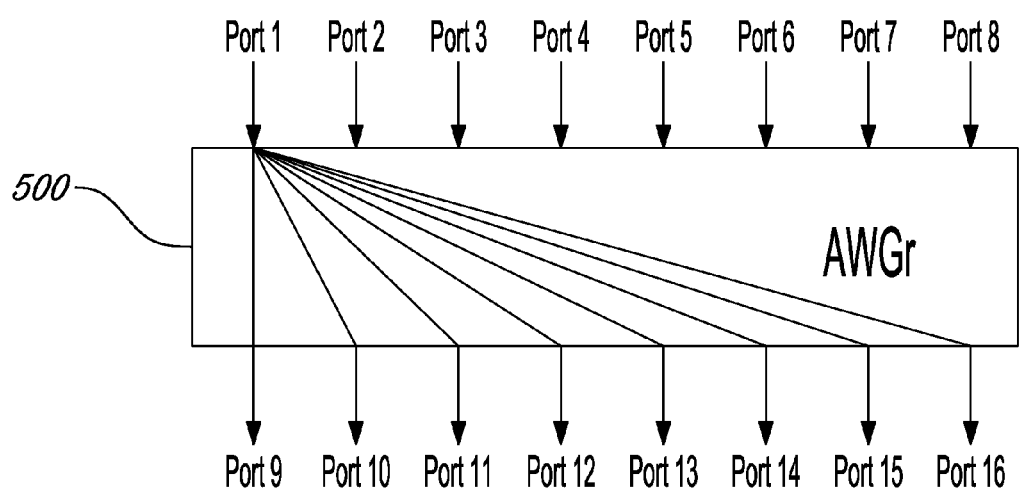
FIG. 5 illustrates a mapping pattern for one port in an AWGr component of an adaptive waveguides assignment device according to an embodiment.

As shown in FIG. 5, a strategic mapping of wavelengths between the input ports and the output ports of the AWGr 500 is manufactured by design. As the name suggests, an "arrayed waveguide grating" is based on the concept of arrayed waveguides, where a diffraction grating consisting of a surface, with many parallel grooves in it, disperses a beam of light into its wavelengths to produce its spectrum. A grating can be used as a wavelength filter. By changing parameters of the grating, e.g. using thermal or electrical tuning, the wavelength that is filtered can be changed. Assuming that different wavelengths are directed to different waveguides, this produces the effect of de-multiplexing the original optical signal into several parallel optical signals of different wavelengths. An AWG router is thus a specialized device with multiple input ports where multiple AWGs, for example, are put together in a way where the optical signals would be carefully redirected towards output ports, as required.

The AWGr 500 refracts light which arrives at each input or source port as a function of its wavelength. For example, can be refracted by 0 degrees, $\lambda 1$ by 1 degree, $\lambda 2$ by two degrees, etc., resulting in a fan-like distribution of the incoming wavelengths as shown. In the example shown in FIG. 5, port 1 of the AWGr 500 distributes the incoming wavelengths between all the available output ports, i.e., between ports 9 to 16. Therein, each line between port 1 and ports 9-16 represents a different incoming optical wavelength, e.g., a red wavelength can pass straight through from port 1 to port 9 while a violet wavelength can be directed from port 1 to port 16. For the other input ports, i.e., for ports 2 to 8, the same mapping pattern can be used. For example, for port 2, the red wavelength would be redirected to port 10, the orange wavelength would be mapped to port 11, the yellow wavelength would be mapped to port 12, etc.

Figure 6:
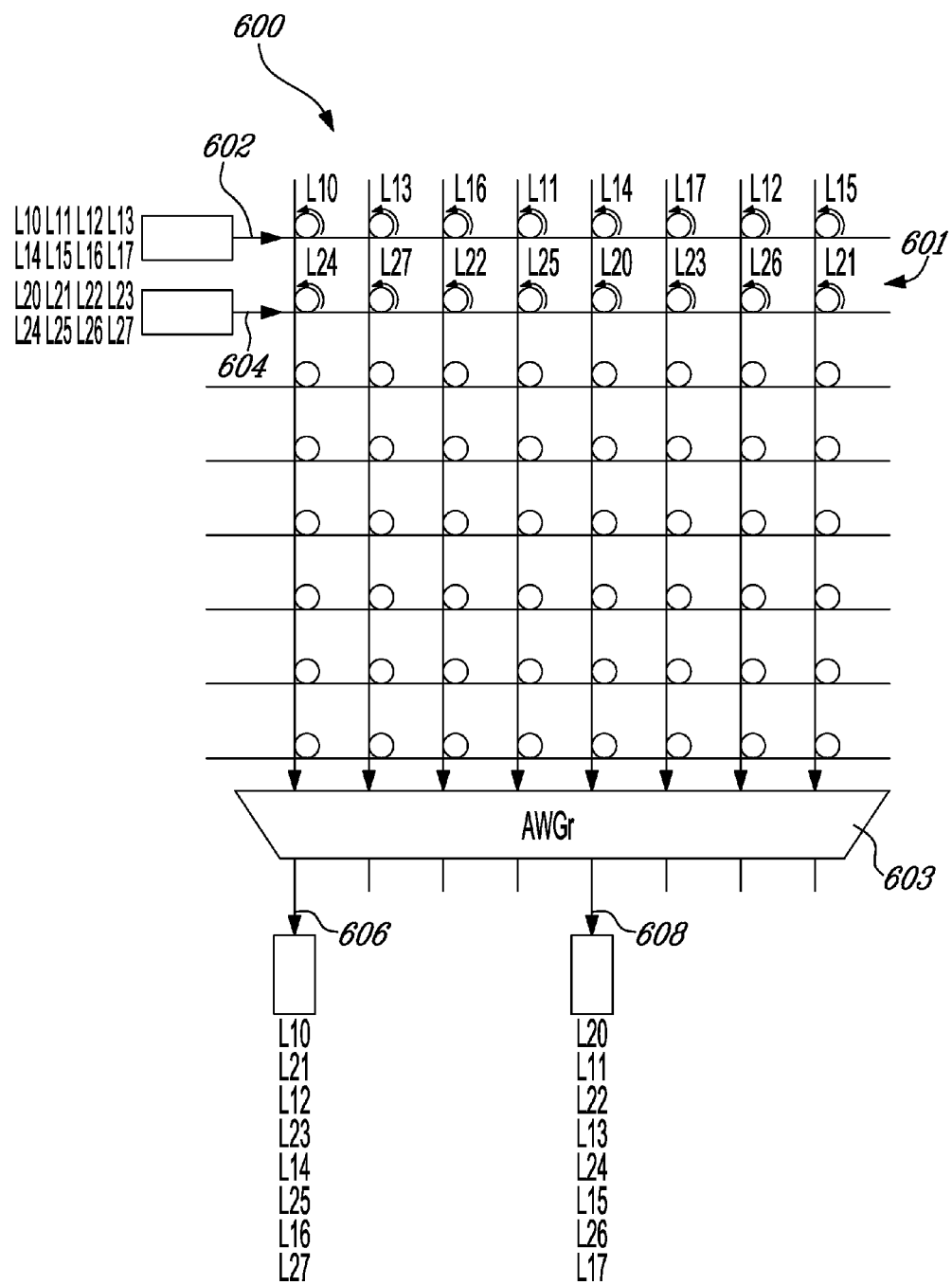
FIG. 6 depicts WDM 2-to-2 ports connectivity using an egress-based adaptive waveguides assignment device according to an exemplary embodiment.

Using the capability in a micro-ring based optical crossbar 200 to tune the micro-ring resonator 202 on the incoming waveguide 206, it becomes possible to dynamically redistribute the wavelengths when new ports are activated in an adaptive waveguides assignment device. Assuming, for example, that a new input port and a new output port were added to an adaptive waveguides assignment device according to an embodiment with a 1-to-1 configuration, and that half of the wavelengths from the first input port would have to be redirected to each of the two available output ports, the tuning of the micro-ring resonators in such a device would be performed as shown in FIG. 6. Therein, the adaptive waveguides assignment device 600 illustrates how the interconnections between components can be scaled as they are added or removed from a system. Even though this example shows a perfectly symmetrical distribution of the wavelengths from an incoming port, e.g., input port 602 or 604, between two output ports 606 and 608, it is also possible to tune the micro-ring resonators (represented again in FIG. 6 by a circle with an arrow around part of the circumference of the circle) in order to provide a more asymmetric distribution. In the present specification examples are provided wherein all of the wavelengths received on an input port are distributed evenly between all the available output ports, but it will be appreciated by those skilled in the art that the present invention is not limited to such implementations.

Figure 7:
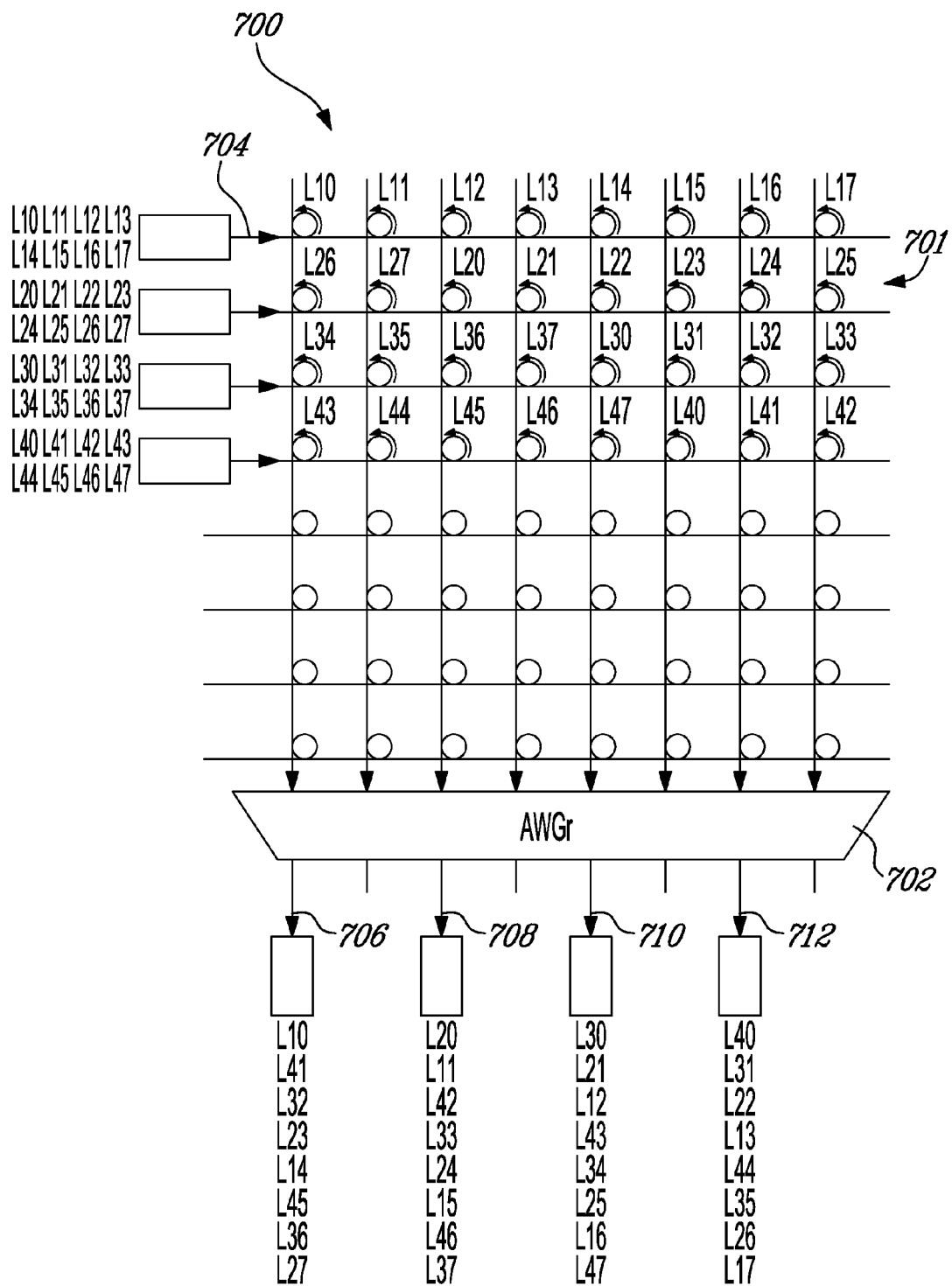
FIG. 7 depicts WDM 4-to-4 ports connectivity using an egress-based adaptive waveguides assignment device according to an exemplary embodiment.

FIG. 7 depicts another egress-based embodiment, similar to that of FIGS. 4 and 6, but for a 4-to-4 ports configuration adaptive waveguides assignment device 700 including an optical crossbar 701 and AWGr 702. Using the same type of wavelength mapping in the AWGr 702 as described above, and an appropriate tuning of the micro-ring resonators in the optical crossbar 701, it is possible to evenly distribute the wavelengths from an input port, e.g., input port 704, to four output ports, e.g., output ports 706-712. In such an embodiment, it should also be noted that the output ports 706-712 are interleaved.

However, to extend the 4-to-4 ports embodiment above to an 8-to-8 ports configuration, it is not possible to distribute all the wavelengths evenly from an input port to the output ports. More specifically, in the case of the 8×8 ports configuration, when trying to configure the different micro-rings in order to distribute evenly the eight wavelengths incoming to each input port among all the output ports, there is a clash of wavelengths produced by the distribution of the wavelengths in the AWGr. By distributing the eight wavelengths of the first input port between eight output ports, the AWGr forces the redirection of the wavelengths to certain output ports, which ends up creating the situation where two different wavelengths are redirected to the same output port. This, in turn, leads to seven output ports for eight wavelengths, with one output port not receiving any wavelength from this input port. One way to avoid this situation is by removing the second wavelength being redirected to the already redirected output port, and by replacing the removed wavelength with a new lambda, that behaves on the AWGr as a direct passthrough between the input and output port. The micro-ring resonator connected to the output waveguide of the empty output port can then be configured to redirect the new extra wavelength, which will behave in the AWGr as a direct connection to the output port of the combined device.

Figure 8:
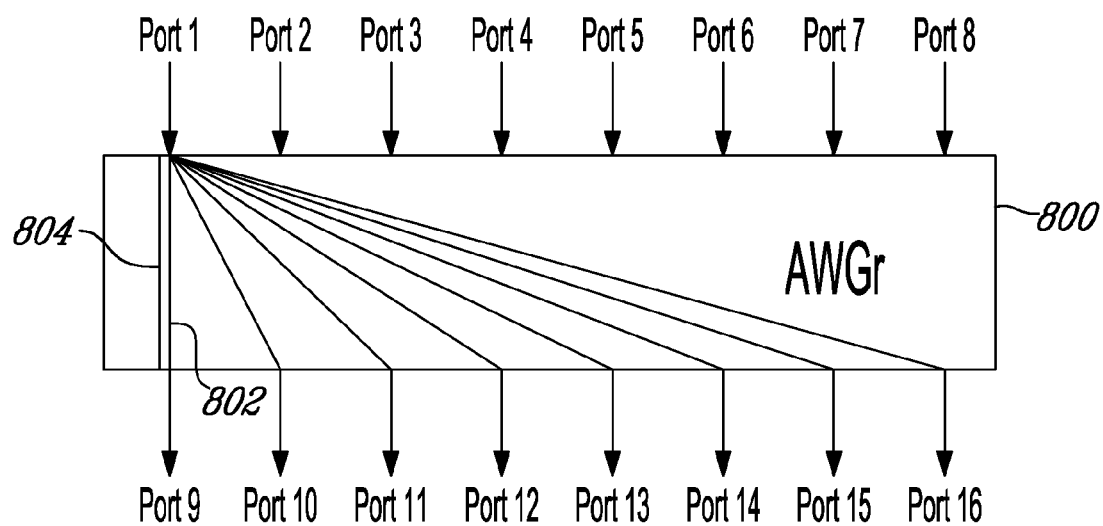
FIG. 8 illustrates a mapping pattern using an extra wavelength for one port in an AWGR component of an adaptive waveguides assignment device according to an embodiment.

Thus, in order to address the limitation of not being able to evenly distribute the wavelengths between all of the output ports, an exemplary embodiment maps an "extra" or alternative wavelength in the AWGr component 100, as for example, shown in FIG. 8. Therein, the AWGr 800 is designed to transfer both a first wavelength 802 and a second, extra or alternative wavelength 804 from port 1 to port 9 of the device.

Figure 9:
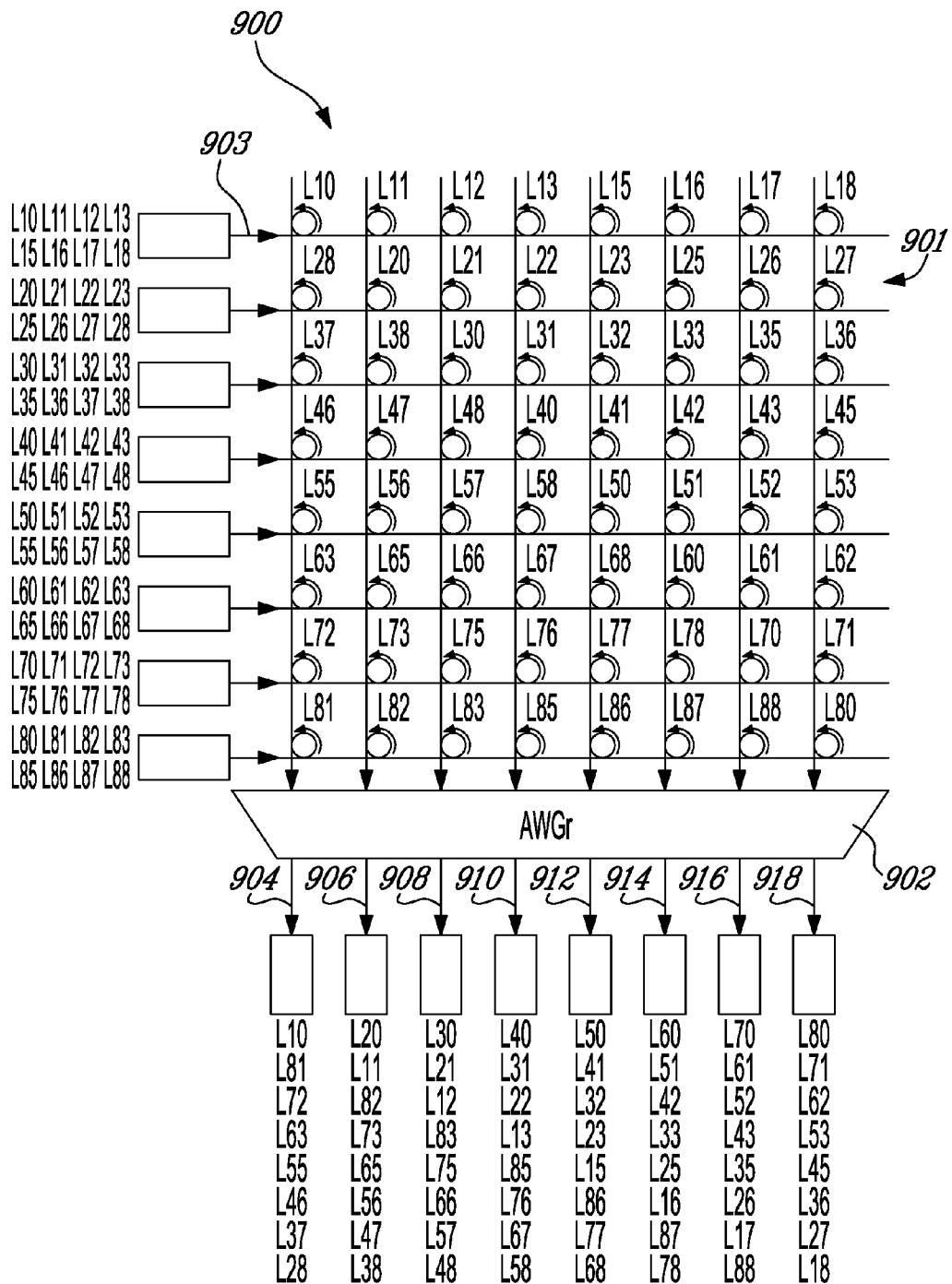
FIG. 9 depicts WDM 8-to-8 ports connectivity using an egress-based adaptive waveguides assignment device according to an exemplary embodiment.

Using the extra or alternative wavelength 804 and an AWGr 800 which is designed to map that extra wavelength to the same output port as another, related wavelength 802, it becomes possible to distribute the incoming wavelengths from an input port between several output ports in an embodiment having an 8-to-8 ports configuration, an example of which is shown in the adaptive waveguides assignment device 900 having an optical crossbar 901 and AWGr 902 in FIG. 9. Therein, it is seen that all of the wavelengths which arrive on input port 903 are distributed evenly among the output ports 904-918. This embodiment thus requires that one of the existing wavelengths is replaced by the extra or alternative wavelength, which in this illustrative example is the case for the green wavelength (which would have been shown as L14) being replaced by another red wavelength shown as L18.

Usage of one or more extra or alternative wavelengths according to this embodiment requires that the senders of the optical signals on the input ports have the capability to dynamically change the wavelengths they can use to interconnect. In the case where it would not be possible for a sender to dynamically change the wavelength associated with a port, another alternative is to reserve an extra input port in the optical crossbar component 901, which extra input port could be used for providing an extra wavelength when required. This extra input port could also be used to operate as a back-up in case of the failure of another port.

The foregoing examples focus on egress-based embodiments wherein an AWGr is placed after an optical crossbar. However such embodiments may have limitations in terms of scalability and flexibility with regards to lambda distribution from input ports to output ports, which requires the aforedescribed extra wavelengths to address the problem. On the other hand, when an AWGr is placed before an optical crossbar, it is possible to evenly distribute all wavelengths of an input between the available output ports, without requiring any extra wavelengths. It is also possible to configure the combined device in order to be working in a transparent mode, i.e. without any wavelengths mapping between ports. Accordingly, some exemplary embodiments which described ingress-based embodiments wherein the AWGr is placed in front of the optical crossbar will now be discussed.

Figure 10:
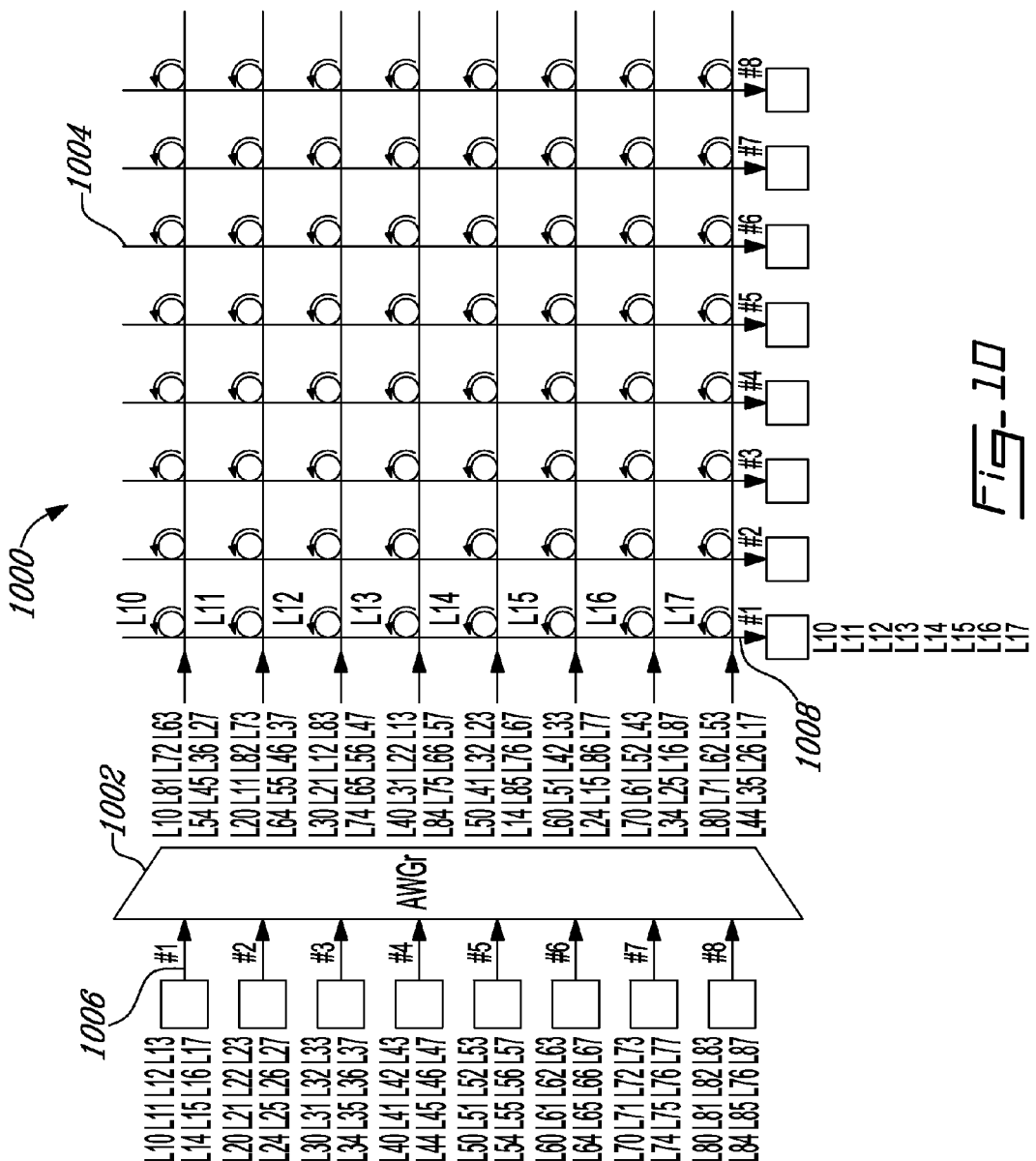
FIG. 10 depicts WDM 1-to-1 port connectivity using an ingress-based adaptive waveguides assignment device according to an exemplary embodiment.

As shown in FIG. 10, an ingress-based adaptive waveguides assignment device 1000 according to an exemplary embodiment includes an AWGr 1002 whose output ports are connected to the input ports of an optical crossbar 1004. As illustrated, the device 1000 is used to redirect all the wavelengths from an input port 1006 to a single output port 1008. More specifically, in this example, the micro-ring resonator optical crossbar 1004 is configured to direct all wavelengths of ingress port 1006 to the single egress port 1008. Since the AWGr 1002 has a pre-determined, static mapping of wavelengths from its input ports to its output ports, a specific tuning of the micro-ring resonators in the optical crossbar 1004 is used in order to produce the expected routing behavior of the optical wavelengths.

While the behavior of the ingress-based embodiment 1000 shown in FIG. 10 is similar to the behavior of the egress-based embodiment 400 shown in FIG. 4, one difference between these embodiments is that the micro-ring resonators need to be configured horizontally in one case, and vertically in the other case. This difference can be quite meaningful in terms of flexibility. More specifically, in the case of the egress-based configuration 400, the selection of which wavelength should be redirected to which output port is performed horizontally. That means that the configuration of the micro-ring resonators in the optical crossbar 406 is performed based on the criteria that each wavelength from an incoming port needs to the redirected to an output port. On the other hand, in the case of the ingress-based configuration 1000, the selection of which wavelength should be redirected to which output port is performed vertically. That means that the configuration of the micro-ring resonators in the optical crossbar 1004 is performed based on the criteria that each output port needs to select a specific wavelength from each row.

Figure 11:
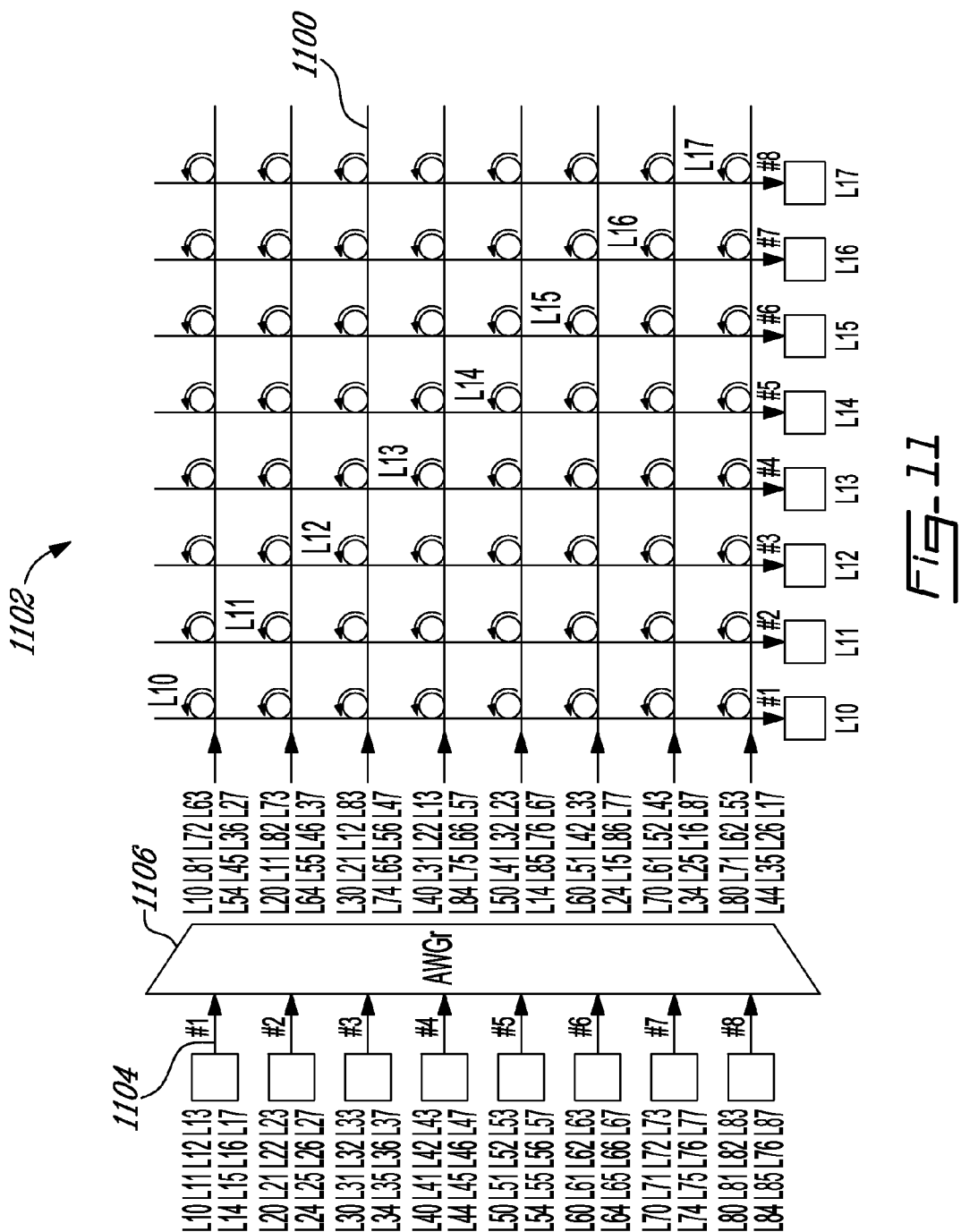
FIG. 11 depicts WDM 1-to-8 ports connectivity using an ingress-based adaptive waveguides assignment device according to an exemplary embodiment.

As shown in FIG. 11, the micro-ring resonator crossbar 1100 of device 1102 is configured to evenly distribute all wavelengths of ingress port 1104 to all eight egress ports of the device 1100. By placing the AWGr 1106 before the optical crossbar 1100, this enables the device 1100 to distribute the wavelengths (lambdas) over all of the available rows of the optical crossbar 1100. Given that each row can be considered as a separate plane, and that each plane could be independently managed, it becomes possible to create a more flexible device in terms of lambda redirection than using an egress-based configuration. As shown in FIG. 11, this configuration allows each lambda of an input port to be redirected to any of the output ports, without the limitations imposed by an egress-based AWGr placement.

Figure 12:
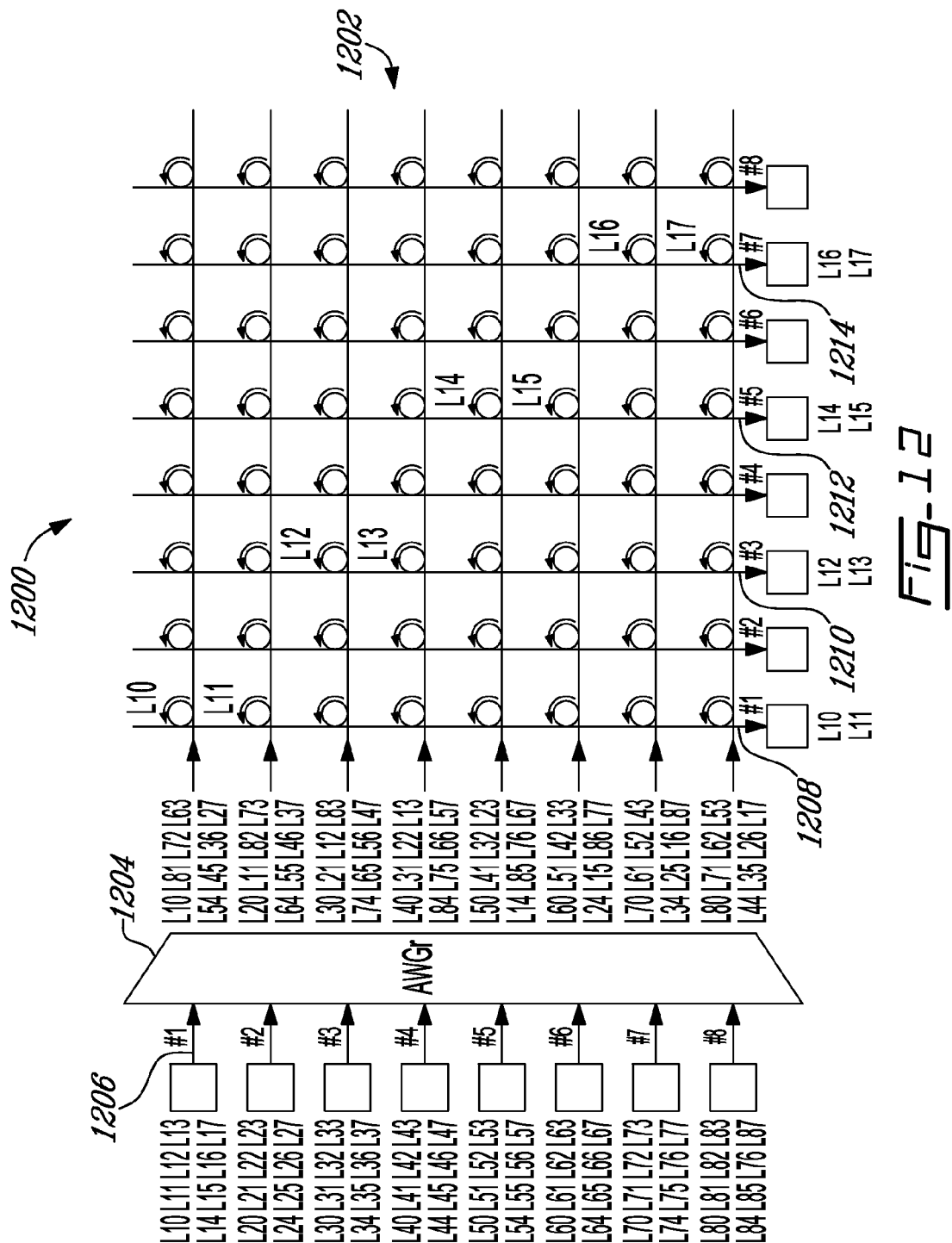
FIG. 12 depicts WDM 1-to-4 ports connectivity using an ingress-based adaptive waveguides assignment device according to an exemplary embodiment.

Similarly, as shown in FIG. 12, an ingress-based adaptive waveguides assignment device 1200 can include a micro-ring resonator crossbar 1202 and AWGr 1204 which is configured to interleave all bandwidth sourced from ingress port 1206 to half of the egress ports (e.g., odd numbered ports 1208, 1210, 1212 and 1214) in an even distribution. The wavelengths of an input port can be redirected to any of the output ports using such ingress-based embodiments. In comparison with the egress AWGr-based configurations described above, the output ports do not have to be interleaved, i.e., all of the wavelengths from a single input port could be directed to adjacent output ports. Even though FIG. 12 only shows the distribution of the lambdas of a single input port among four output ports, according to another embodiment optical signals received on four input ports using this configuration would provide for full control over the distribution of their lambdas.

Figure 13:
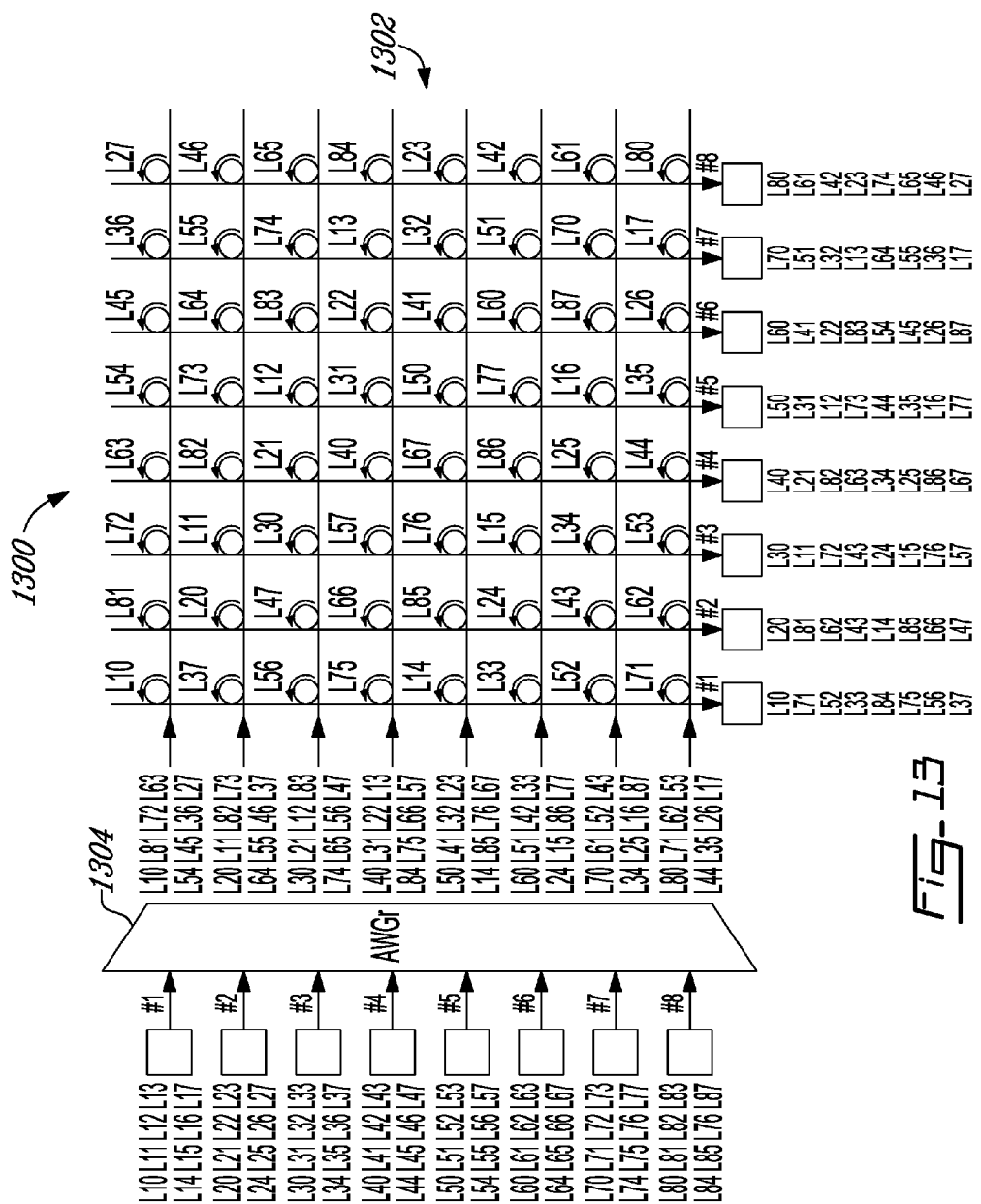
FIG. 13 depicts WDM 8-to-8 ports connectivity using an ingress-based adaptive waveguides assignment device according to an exemplary embodiment.

In FIG. 13, a full capacity ingress-based embodiment 1300 is illustrated, where the micro-ring resonator crossbar 1302 is configured to evenly distribute all eight ingress ports wavelengths to all eight egress ports after receiving them from the AWGr 1304. In this embodiment, it is possible to distribute evenly all the lambdas of each input port among all the output ports. In addition to the even distribution, this can be accomplished without requiring any extra wavelengths, as required by the egress AWGr-based configurations described above.

In comparison with the egress AWGr-based embodiments described earlier, the ingress AWGr-based configurations offer, for example, the following advantages: improved selectivity of port destinations, simpler programming algorithm of micro-ring resonator crossbar, and all wavelengths from N ingress ports are routable to N egress ports using N distinct wavelengths (i.e., an N+1th (extra) wavelength is not required). Thus, considering the flexibility of an ingress AWGr-based configuration, and the fact that it does not require any new lambdas for an even distribution of the wavelengths from input ports to output ports, the ingress AWGr-based adaptive waveguides assignment device offers some potential advantages relative to its egress AWGr-based configuration counterpart.

Having described various combinations of optical crossbars and AWGrs to form optical switching or routing devices according to various embodiments, an exemplary configuration algorithm which can be used to configure such devices will now be described. In order to direct an ingress wavelength L·x·w (where x=source port, and w=wavelength index) to an egress port EP, the micro-ring resonator crossbar of the combined device can be programmed as follows:

1) select switch row address=1+modulo_N ((source port−1)+wavelength index)
2) select switch column address=egress port EP
3) tune micro-ring resonator at (row, column) address=wavelength index.

While there might be several reasons for using an adaptive waveguides assignment device according to these embodiments in order to distribute the lambdas received on the input ports between several output ports, there might also be reasons to prefer a more transparent behavior. Using the ingress AWGr-based configurations described herein, it is possible to configure the micro-ring resonators in order to make the new device completely transparent. That means that it would be possible to enable the lambdas from an input port to completely go through the device and be forwarded on a unique output port, i.e., without distributing the wavelengths among different output ports, e.g., as if the device was not present. Moreover, some ports of an adaptive waveguide assignment device could be configured to operate in this transparent or pass-through mode, while other ports could be configured to operate in a distribution mode.

Figure 14:
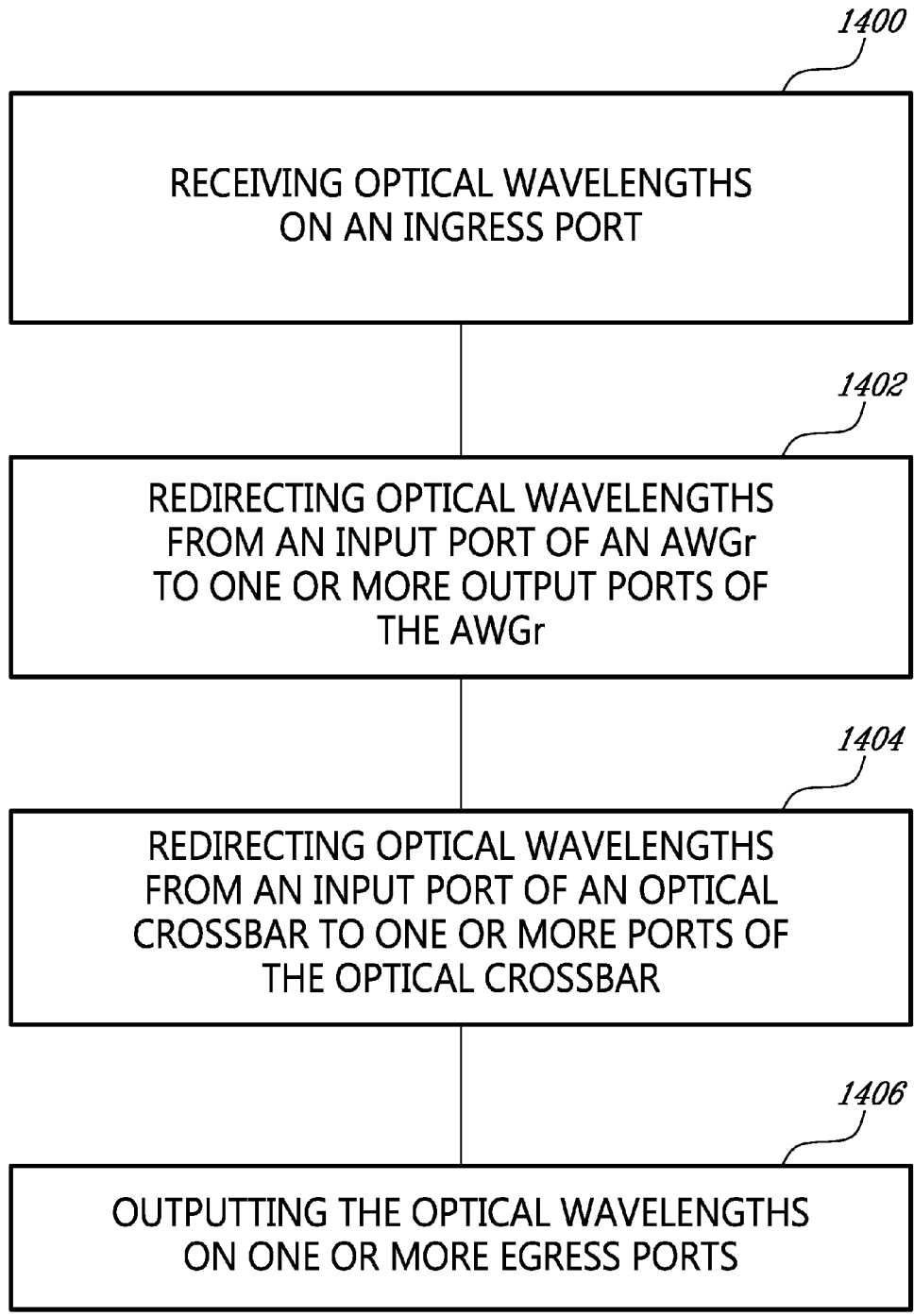
FIG. 14 is a flowchart illustrating a method for routing optical wavelengths according to an embodiment.

According to one embodiment, a method for routing optical wavelengths in an optical interconnect device is illustrated in the flowchart of FIG. 14. Therein, at step 1400, optical wavelengths are received on an ingress port of the optical interconnect device. The optical wavelengths are redirected from an input port of an arrayed waveguide grating router (AWGr) to one or more output ports of the AWGr, as indicated by step 1402 and redirected from an input port of an optical crossbar to one or more output ports of the optical crossbar as indicated by step 1404. The optical wavelengths are output on one or more egress ports of the optical interconnect device. Note that steps 1402 and 1404 can be performed in any desired order, e.g., depending upon whether the optical interconnect device is an egress-based or ingress-based AWGr configuration. Also note that the ingress port may be connected to, or the same as, the input port of the AWGr or optical crossbar, and that the egress ports may be connected to, or the same as, the output ports of the AWGr or optical crossbar, again depending upon the particular implementation or configuration.

Various embodiments described herein provide a number of advantages and benefits. For example, it should be considered advantageous for a system to be capable of optically cross-connecting several wavelengths from the same input port to an output port. Such capability could be used, for example, to allow a system to scale, i.e. by allowing the wavelengths to be dynamically distributed based on the number of output ports activated, which could be interpreted as dependent on the number of blades available within a system at a time. It could also be used to more efficiently interconnect different elements of a system by reducing link numbers: carrying many wavelengths onto a single fiber would spare costly and cumbersome fiber bundles. Also, providing a reconfigurable backplane in the optical domain (i.e. without electrical conversion along the path) is feasible using the above-described embodiments and the like. Such a capability opens the field of fast reconfiguration for fault and failure resiliency as well as in-service maintenance operations.

Embodiments can be built by interconnecting two different, separate devices, i.e. a WDM optical crossbar and an AWGr, or by efficiently integrating both devices into a single unit or device.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. An optical interconnect device comprising:
   an optical crossbar comprising:
      a plurality of input ports for receiving optical signals;
      a plurality of input waveguides in said optical crossbar, each connected to one of said plurality of input ports, for guiding said optical signals;
      a plurality of output ports in said optical crossbar;
      a plurality of output waveguides in said optical crossbar, each connected to one of said plurality of output ports;
      wherein said plurality of input waveguides and said plurality of output waveguides are disposed in an orthogonal relationship; and
      a dual micro-ring resonator disposed at each of a plurality of interconnection points between said plurality of input waveguides and said plurality of output waveguides in said optical crossbar, each of said dual micro-ring resonators being configured to redirect an optical wavelength associated with said optical signals from said one of said plurality of input waveguides to said one of said plurality of output waveguides; and
   an arrayed waveguide grating router (AWGr) connected to said optical crossbar.

2. The optical interconnect device of claim 1, wherein said AWGr has a mapping between its input port and its output ports, and each of the dual-micro ring resonators in said optical crossbar is tuned to redirect a wavelength, such that all of the wavelengths which are input to said optical interconnect device on an ingress port are distributed unevenly among egress ports of said optical interconnect device.

3. The optical interconnect device of claim 2, wherein said at least one dual micro-ring resonator further comprises:
   a first micro-ring connected to said one of said plurality of input waveguides;
   a second micro-ring connected to said one of said plurality of output waveguides; and
   a coupler configured to transfer light having said optical wavelength from said first micro-ring into said second micro-ring.

4. The optical interconnect device of claim 1, wherein said AWGr further comprises a plurality of arrayed waveguide gratings each associated with an input port of said AWGr and configured to direct wavelengths received at a respective input port of said AWGr toward different output ports of said AWGr.

5. The optical interconnect device of claim 1, wherein said optical crossbar includes first input ports and first output ports and said AWGr includes second input ports and second output ports.

6. The optical interconnect device of claim 5, wherein said first output ports of said optical crossbar are connected to said second input ports of said AWGr, wherein said optical interconnect device is an AWGr egress-based device.

7. The optical interconnect device of claim 6, wherein said AWGr directs at least two wavelengths from one of said second input ports to one of said second output ports.

8. The optical interconnect device of claim 5, wherein said second output ports of said AWGr are connected to said first input ports of said optical crossbar, wherein said optical interconnect device is an AWGr ingress-based device.

9. The optical interconnect device of claim 1, wherein said AWGr has a mapping between its input port and its output ports, and each of the dual-micro ring resonators in said optical crossbar is tuned to redirect a wavelength, such that all of the wavelengths which are input to said optical interconnect device on an ingress port are distributed evenly among egress ports of said optical interconnect device.

10. A method for routing optical signals in an optical interconnect device, the method comprising the steps of:
   receiving optical signals on a plurality of input ports of an optical crossbar;
   guiding said optical signals from said plurality of input ports to a plurality of output ports of the optical crossbar, wherein the plurality of input ports are each connected to an input waveguide, wherein the plurality of output ports are each connected to an output waveguide and wherein said plurality of input waveguides and said plurality of output waveguides are disposed in an orthogonal relationship; and
   redirecting optical wavelengths associated with said optical signals from said plurality of input waveguides to said plurality of output waveguides using dual micro-ring resonators disposed at each of a plurality of interconnection points between said plurality of input waveguides and said plurality of output waveguides in said optical crossbar; and
   redirecting said optical wavelengths towards outputs of an arrayed waveguide grating router (AWGr) connected to said optical crossbar.

11. The method of claim 10, further comprising the step of:
transferring light having a given optical wavelength from a first micro-ring connected to said one of said plurality of input waveguides into a second micro-ring connected to said one of said plurality of output waveguides using a coupler.

12. The method of claim 10, further comprising the step of:
redirecting wavelengths received at a respective input port of said AWGr toward different output ports of said AWGr, wherein said AWGr further comprises a plurality of arrayed waveguide gratings each associated with an input port of said AWGr.

13. The method of claim 10, wherein said optical crossbar includes first input ports and first output ports and said AWGr includes second input ports and second output ports.

14. The method of claim 13, wherein said first output ports of said optical crossbar are connected to said second input ports of said AWGr, wherein said optical interconnect device is an AWGr egress-based device.

15. The method of claim 14, further comprising the step of:
redirecting at least two wavelengths from one of said second input ports to one of said second output ports in said AWGr.

16. The method of claim 13, wherein said second output ports of said AWGr are connected to said first input ports of said optical crossbar, wherein said optical interconnect device is an AWGr ingress-based device.

17. The method of claim 10, further comprising the step of:
redirecting and distributing evenly all of the wavelengths which are input to said optical interconnect device among egress ports of said optical interconnect device by mapping input port and output ports in the AWGr, wherein each of the dual-micro ring resonators in said optical crossbar are tuned to redirect a given wavelength.

18. The method of claim 10, further comprising the step of:
redirecting and distributing unevenly all of the wavelengths which are input to said optical interconnect device among egress ports of said optical interconnect device by mapping input port and output ports in the AWGr, wherein each of the dual-micro ring resonators in said optical crossbar are tuned to redirect a given wavelength.

\* \* \* \* \*